United States Patent Office 2,759,622
Patented Aug. 21, 1956

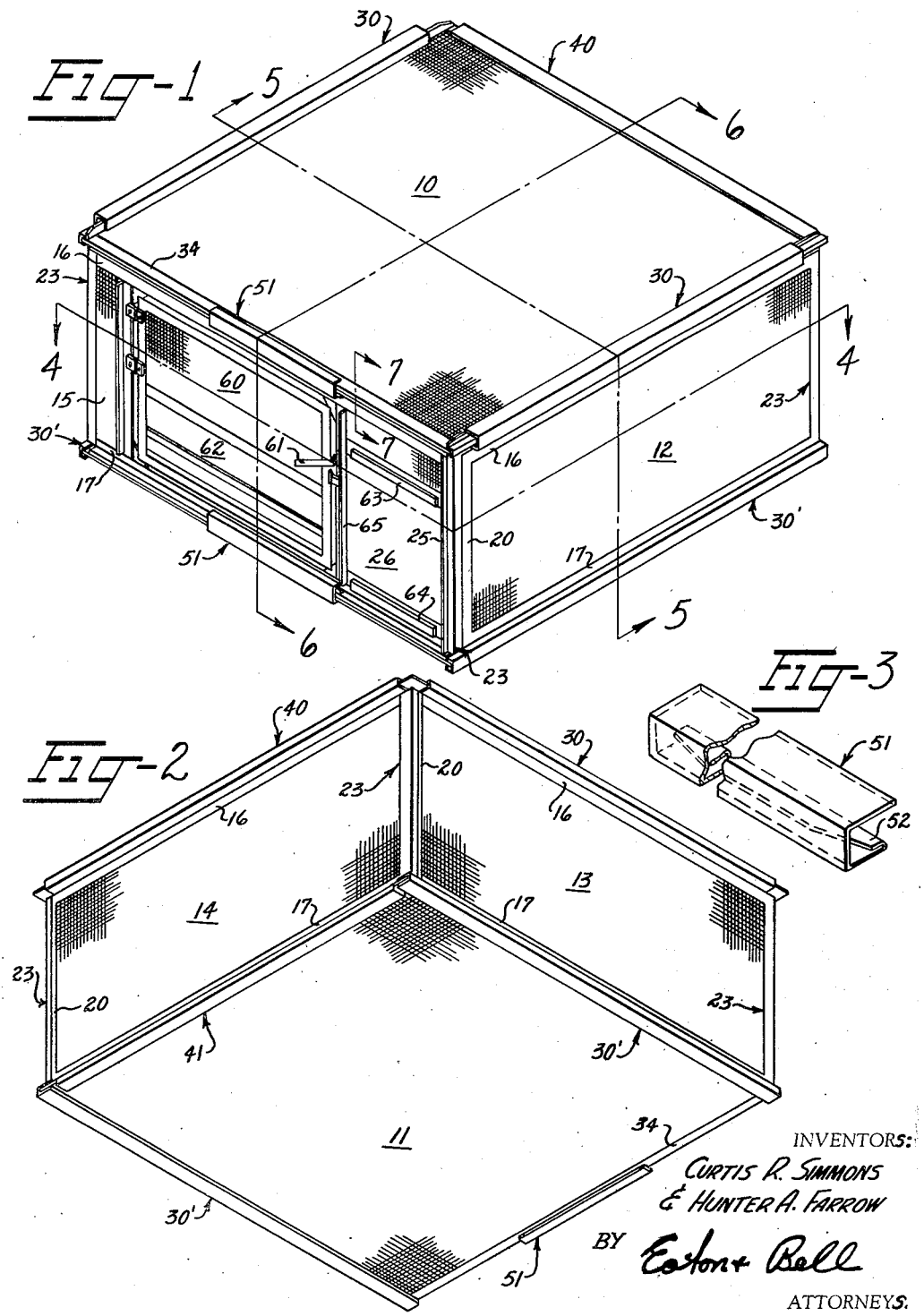

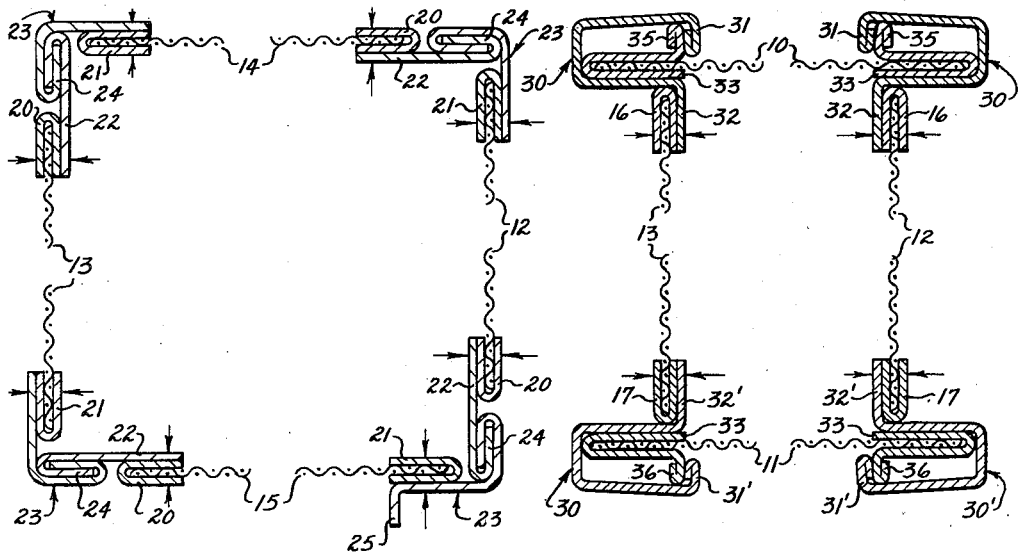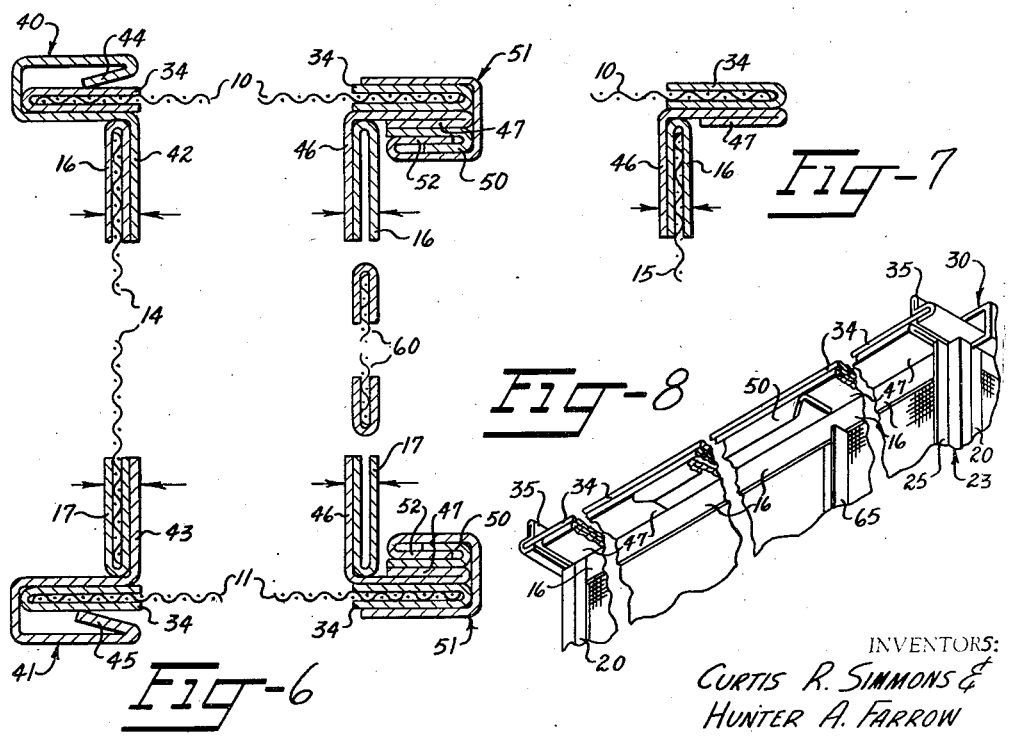

2,759,622
ANIMAL CAGE
Curtis R. Simmons, Kannapolis, N. C., and Hunter A. Farrow, New Market, Va., assignors to Hunter Farrow Equipment, Inc., China Grove, N. C., a corporation of North Carolina Application March 9, 1953, Serial No. 340,950

4 Claims. (Cl. 220—4)

This invention relates to animal cages and more especially to that type of animal cage which is particularly adapted to be used for chinchillas and which is collapsible and can be readily assembled and disassembled with a minimum of effort.

Heretofore, cages have been provided for chinchillas and the like which are collapsible and which have spaced side walls and top and bottom walls, but these walls have been secured together by clamps and various other means, none of which have been successful in eliminating rattling contact between the component parts of the cage during movement of the animals within the cage. This rattling noise tends to frighten the animals and causes them to damage their own fur, thus resulting in loss of value. Also, it has been difficult to assemble and disassemble such prior cages.

It is therefore a primary object of this invention to provide a collapsible animal cage which has a minimum number of moving parts and which can be secured together in such a manner as to avoid rattling of the component parts during movement of the animals within the cage. The absence of noise in a cage used for chinchillas and other highly sensitive animals is a very important feature inasmuch as chinchillas are very timid animals and any noise tends to frighten them and cause them to become excited frequently causing damage to their fur.

It is more specifically an object of this invention to provide a collapsible cage having a top wall, a bottom wall and four spaced side walls, each of said walls being formed of foraminated material, such as wire mesh, and the edges of said walls being provided with interlocking flanges for securing the side walls and the top and bottom walls together in such a manner as to eliminate all rattling contact between said walls during movement of the animals within the cage.

It is another object of this invention to provide an animal cage of knock-down construction having a plurality of wall members each provided with locking flanges at its edges to permit said walls to be interlocked in erecting the cage and whereby additional securing means such as bolts or the like are unnecessary.

Some of the objects of the invention having been stated, other objects will appear as the description proceeds, when taken in connection with the accompanying drawings in which—

Figure 1 is an isometric view of the improved cage showing the same assembled and looking at the upper front portion thereof;

Figure 2 is an isometric view looking up at the bottom and rear portions of the cage;

Figure 3 is an enlarged view of the slide fastener element used to fasten the top and front walls together;

Figure 4 is an enlarged sectional plan view taken substantially along the line 4—4 in Figure 1 omitting the bottom wall for purposes of clarity;

Figure 5 is an enlarged transverse vertical sectional view taken along the line 5—5 in Figure 1 with the rear wall omitted;

Figure 6 is an enlarged longitudinal vertical sectional view taken along the line 6—6 in Figure 1 with the side wall omitted;

Figure 7 is an enlarged fragmentary vertical sectional view taken along the line 7—7 in Figure 1;

Figure 8 is an enlarged fragmentary isometric view looking up at the under surface of the front edge of the top wall with the slide fastener removed.

The arrows in Figures 4, 5, 6 and 7 indicate points where the parts may be spot welded, if desired.

Referring more specifically to the drawings, it will be observed that the cage has suitable walls or panels including a top wall 10, a bottom wall 11, side walls 12 and 13, a back wall 14 and a front wall 15, each of said walls or panels being formed of a foraminated material such as wire mesh or the like. In this connection it is to be understood that, although the drawings show each of the walls just described as being formed of foraminated material, the invention is not to be limited thereto, as any suitable material can be used for making the walls and in some instances it may be desirable to make one or more of the walls of solid material such as wood, sheet metal or the like.

Each of the vertical panels or walls 12, 13, 14 and 15 is circumscribed by a frame including upper and lower frame members 16 and 17 and vertical frame members 20 and 21, all of which are preferably formed of sheet metal or the like, and each of which is substantially U-shaped in cross-section. Opposite legs of each of the frame members 16, 17 and 20, 21 straddle the edges of the foraminated panels and said panels are secured within the confines of the frame by any suitable means such as spot welding, clamping or the like.

The novel method by which the walls or panels 10, 11, 12, 13, 14 and 15 are fastened together so as to eliminate rattling contact therebetween constitutes the essence of the invention. It will be observed that each of the vertical frame members 20 on the vertical panels 12, 13, 14 and 15 has secured thereto a vertically extending U-shaped flange member 22, formed of sheet metal or the like, and extending outwardly from but in alinement with the respective frame member 20. The inner leg of each flange 22, which is secured to the inner surface of the respective frame member 20, is of substantially greater length than is the outer or free leg thereof.

Each of the frame members 21 has secured thereto a vertically extending L-shaped flange member 23, one leg of each of said L-shaped flange members 23 being secured to the outer surface of the respective frame member 21, and the free leg of each L-shaped flange member 23 being doubled back upon itself as at 24. Thus the U-shaped flange member 22 of each adjacent panel may be slid into place between the L-shaped flange 23 and its turned back free end 24 of the next adjacent panel thereby firmly securing the adjacent panels 12, 13, 14 and 15 together in right angular relationship as will be most clearly observed in Figure 4.

It will be observed that the L-shaped flange 23 secured to the frame member 21 on the right hand edge of the front panel 15 has a forwardly extending projection 25 thereon. This projection 25 forms one edge of an opening 26 for a nesting box, not shown, but which may be of the type clearly set forth in my co-pending application entitled Nesting Box, Serial Number 340,949, filed of even date herewith.

Each of the longitudinally extending frame members 16 secured to the upper edges of panels 12 and 13 has affixed thereto a channel-shaped guide member 30 preferably formed of sheet metal or other somewhat resilient or bendable material and being identical but opposite hand. The free edge of the upper leg of each member 30 is bent downwardly and then upon itself to form a flange portion 31. The lower leg of each of the channel-shaped guide members 30 has a downwardly depending portion 32 which is fixedly secured to the inner surface of the respective frame member 16 by any suitable means such as spot welding or the like.

Each of the frame members 17 secured to the lower longitudinal edges of the panels 12 and 13 also has a channel-shaped guide member 30' secured thereto in exactly the same manner as that previously described in association with the frame members 16, except that the member 30' in association with the frame 17 depends downwardly therefrom, while the member 30 in association with the frame 16 extends upwardly therefrom, and like parts bear like reference characters with a prime notation added.

Each of the horizontal top and bottom panels 10 and 11 is circumscribed by a frame similar to those of the side walls and including longitudinally extending frame members 33 and transversely extending frame members 34, all of which are preferably formed of sheet metal or the like, and each of which is substantially U-shaped in cross-section. The legs of the U-shaped frame members 33 and 34 straddle the edges of the panels 10 and 11, and said panels are secured therebetween by any suitable means such as clamping, spot welding or the like. The frame members 33 which extend longitudinally along the outer edges of the top panel 10, each has the upper leg thereof bent upwardly and then back upon themselves to form a vertical flange or rib 35 as shown in Figure 5.

The frame members 33 which extend along the longitudinal edges of the bottom panel 11 each has the lower leg thereof turned downwardly and bent back upon itself to form a vertical flange or rib 36 also shown in Figure 5.

After the vertical walls have been erected or assembled in the manner indicated the top and bottom walls are assembled by sliding the same from front to rear into position. As the top panel 10 is slid in place within the confines of the channel-shaped guide members 30, the innermost surface of the upturned flanges 35 of the frame members 33 will slidably engage the inner surfaces of the downturned flanges 31 of the channel-shaped guide members 30 and the upper surface of the flanges 35 will slidably engage the inner surface of the upper leg of the channel-shaped guide members 30. The inherent resiliency of the channel-shaped guide members 30 will permit the upper legs thereof to flex upwardly upon insertion of the frame members 33 and the tendency of the upper legs of the members 30 to return to parallel relation to the lower legs thereof will thus cause the same to tightly bind the frame members 33 and thus prevent any rattling contact between the top panel 10 and the side panels 12 and 13.

The bottom panel 11 is slid into place between the channel-shaped guide members 30' depending downwardly from the side walls 12 and 13 in exactly the same manner as is the top panel 10 and the ribs 36 together with the inherent spring-like or resilient nature of the channel-shaped guide members 30' also serve to firmly secure the frame members 33 on the longitudinal edges of the bottom panel 11 to the side walls 12 and 13 to likewise prevent rattling contact between the same.

The top and bottom panels 10 and 11 are further resiliently secured along their respective rear edges by means of transversely extending spring locking members 40 and 41 secured, respectively, to the upper and lower frame members 16 and 17 of the rear panel 14 (Figure 6). Each of the spring locking members 40 and 41 is substantially channel-shaped in cross section and is preferably formed of sheet metal or the like. The lower flange of the spring locking member 40 is turned downwardly as at 42 and the upper flange of the spring locking member 41 is turned upwardly as at 43, said portions 42 and 43 being secured to the inner surfaces of respective upper and lower frame members 16 and 17 by any suitable means such as welding or the like. The free end of the upper flange of the spring locking member 40 is bent downwardly and then inwardly to form a leaf spring-like portion 44, and the free end of the lower flange of the spring locking member 41 is bent upwardly and then inwardly to form a leaf spring-like portion 45. Since each of the spring locking members 40 and 41 are preferably formed of sheet metal the inherent resiliency of the springs 44 and 45 serves to tightly bind the transverse members 34 of the top and bottom panels 10 and 11 when the same are slid into position within the confines of the spring locking members 40 and 41 respectively.

Each of the upper and lower frame members 16 and 17 extending transversely along the upper and lower edges of the front panel 15 has secured thereto an L-shaped member 46 (Figure 6), one leg of each of said L-shaped members 46 being secured to the outer surfaces of respective members 16 and 17 by any suitable means such as welding or the like, and the other or free leg of each of the members 46 is bent back upon itself as at 47. A U-shaped flange member 50 is secured to each of the portions 47 of the L-shaped members 46. The flange 50 need not extend the entire length of the frame members 16 and 17 but may be positioned centrally thereon and need be only of such length as is necessary to accommodate suitable slide fasteners such as slide fasteners 51.

The slide fasteners 51 are substantially channel-shaped in cross-section and are adapted to secure the top and bottom panels 10 and 11 to the respective upper and lower edges of the front panel 15. The channel-shaped slide fasteners 51 are each provided with a lower inturned flange 52 (Figures 3 and 6) adapted to slidably mate with the U-shaped flange 50.

The front panel 15 is provided with a conventional centrally disposed access opening closed by a suitable door 60 of conventional or other construction and preferably provided with a latch 61 and a feed tray opening 62. The front panel also has the nesting opening 26 previously mentioned, the upper and lower edges of which are defined by flanges 63 and 64, respectively, and the side edges of which are defined by the flange 25 and a flange 65 which flanges 63 and 64 are particularly adapted for connecting a nesting box, not shown to the front panel 15.

The first step in assembling the cage is to secure together the vertical panels 12, 13, 14 and 15 by means of the interlocking flange members. For example, the flange 23 on the panel 12 can be engaged with the flange 22 on the panel 14 and the flange 22 on the panel 13 can be engaged with the flange 23 on the panel 14. The front panel 15 is then secured to the side panels 12 and 13 in identical manner.

The top and bottom panels 10 and 11 can then be slid into place in the channel-shaped guide members 30 and 30' secured to the upper and lower longitudinal edges of the side walls 12 and 13. It will be noted in Figure 6 that as the top panel 10 is slid completely into place within the channel-shaped guide members 30 that the transverse frame member 34 of the panel 10 will engage the spring locking member 40 and will be held firmly in place by the downwardly depending leaf spring portion 44 thereof. In like manner the bottom panel 11 when slid completely through the bottom channel-shaped guide members 30' will likewise be held firmly in place by the upturned portion 45 of the spring locking number 41. After the cage is thus assembled, the slide fasteners 51 are slid into place along respective frame members 34 of the upper and lower edges of the top and bottom panels 10 and 11 and into engagement with the U-shaped flanges 50.

When it is desired to disassemble the cage the reverse process is followed, the slide fasteners 51 first being removed and the top and bottom panels then being disengaged from the spring locking members 40 and 41, after which the vertical panels can be pulled apart from each other.

It is thus seen that we have provided a cage, the respective walls of which are provided with novel fastening means in the form of interlocking flanges, said flanges being so designed as to resiliently but firmly maintain adjacent sides of the cage in close contact, thus preventing rattling of the sides during movement of the animals within the cage.

In the drawings and specification, there has been set forth a preferred embodiment of the invention and although specific terms are employed, they are used in a generic and descriptive sense only, and not for purposes of limitation, the scope of the invention being defined in the claims.

We claim:

1. A boxlike animal cage of knock-down construction comprising a pair of side walls, front and rear walls and top and bottom walls, means for preventing relative rattling movement between said walls comprising flanges secured to the proximate ends of the side walls and front and rear walls for slidably interconnecting said side walls in substantially right-angular relation to the front and rear walls, channel-shaped guide members secured to the upper and lower edges of said side walls and adapted to slidably receive the side edges of the top and bottom walls, vertical ribs secured to said top and bottom walls adjacent the side edges thereof, flanges extending from said channel-shaped guide members engageable with the ribs on the top and bottom walls for clampingly holding said top and bottom walls in position, spring locking members secured to the upper and lower edges of the rear wall, said spring locking members being generally channel-shaped in cross-section and including an inwardly bent portion clampingly engageable with the top and bottom walls adjacent their rearmost edges, and means for frictionally and detachably securing the front edges of the top and bottom wall to the front wall.

2. An animal cage or the like of knock-down construction comprising a pair of side walls, front and rear walls and top and bottom walls, each of said walls being formed of foraminated material, the edges of each of said walls being bound to form a frame circumscribing each of said walls, a first flange secured to one end edge of the side walls and the front and rear walls, said first flange being U-shaped in cross-section, a second flange secured to the other end edge of the side walls and front and rear walls, said second flange being generally L-shaped in cross-section with one leg thereof U-shaped in cross-section, said first and second flanges being slidably engageable with each other to secure the side walls to the front and rear walls in subtantially right-angular relation, channel-shaped guide members secured to the upper and lower edges of said side walls and adapted to slidably receive the side edges of the top and bottom walls, each said channel-shaped guide member having a third flange extending therefrom engageable with the side edges of the top and bottom walls for frictionally holding said top and bottom walls in position, spring locking members secured to the upper and lower edges of the rear wall, said spring locking members being generally channel-shaped in cross-section and including an inwardly bent portion adapted to frictionally engage the frame on the rear edges of the top and bottom walls, relatively short fourth flanges fixed to the upper and lower edges of the front wall, and channel-shaped slide members slidably engageable with said fourth flanges for detachably securing the front edges of the top and bottom walls to the front wall.

3. A generally boxlike animal cage or the like of knockdown construction comprising a plurality of interconnected side walls and a top wall and a bottom wall, substantially channel-shaped guide members having one leg portion thereof secured to the upper and lower edges of at least two of said side walls and adapted to slidably receive the side edges of the top and bottom walls, vertical retaining flanges on the free leg portions of said channel-shaped guide members, said vertical retaining flanges being disposed in spaced parallel relation to the web portion of said channel-shaped guide members, vertical ribs adjacent the side edges of the top and bottom walls slidably engageable with the substantially channel-shaped guide members, the dimensions of the guide members being such that the vertical ribs adjacent side edges of the top and bottom walls will frictionally engage the free legs of the channel-shaped guide members and their vertical retaining flanges while the side edges and the lower and upper surfaces adjacent the side edges of the top and bottom walls respectively will frictionally engage the web portion of the channel-shaped guide member and the fixed leg thereof respectively, and the free leg of said channel-shaped guide members being flexible under pressure of said vertical ribs to clampingly support said top and bottom walls against rattling movement relative to the side walls.

4. In a box-like structure of knock-down construction comprising a pair of side walls, front and rear walls, top and bottom walls and means for locking said side walls in right angular relation to said front and rear walls; the combination of means for slidably engaging said top and bottom walls with the other of said walls under spring tension to prevent relative rattling movement between the walls of said structure, said last-named means comprising channel-shaped guide members secured to the upper and lower edges of said side walls and adapted to slidably receive the side edges of the top and bottom walls, each of said channel-shaped guide members including a first horizontally disposed leg supported by the marginal edge of its respective side wall and extending outwardly therefrom, a vertically disposed leg extending from the outer edge of said first horizontally disposed leg, a second horizontally disposed leg extending inwardly from said vertical leg and a flange extending in right angular relation from the inner edge of said second horizontally disposed leg and terminating in spaced relation from said first horizontally disposed leg, vertically disposed ribs secured to the upper and lower surfaces of the top and bottom walls respectively and each of said ribs being spaced inwardly from one side edge thereof, and said ribs being engageable with the second horizontally disposed legs and with the flanges on said channel-shaped guide members to create spring tension as the top and bottom walls are slid into position within said channel-shaped guide members.

References Cited in the file of this patent

UNITED STATES PATENTS

| | | |
|---|---|---|
| 390,791 | Marmion | Oct. 9, 1888 |
| 909,628 | Longfellow | Jan. 12, 1909 |
| 1,051,250 | Norton | Jan. 21, 1913 |
| 1,159,229 | Keith | Nov. 2, 1915 |
| 2,466,226 | Gilbertie | Apr. 5, 1949 |
| 2,522,097 | Cookson | Sept. 12, 1950 |